US012807118B2

(12) United States Patent
Derouault et al.

(10) Patent No.: US 12,807,118 B2
(45) Date of Patent: Nov. 24, 2026

(54) DIAPHRAGM BRAKE CYLINDER WITH REDUCTION RING INTEGRATED IN THE DIAPHRAGM

(71) Applicant: KNORR-BREMSE Systeme fuer Nutzfahrzeuge GmbH, Munich (DE)

(72) Inventors: Sylvain Derouault, Hermival les Vaux (FR); Guillaume Letot, Sannerville (FR); Frank Hemery, La Rivière Saint Sauveur (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 355 days.

(21) Appl. No.: 18/694,486

(22) PCT Filed: Oct. 27, 2022

(86) PCT No.: PCT/EP2022/080100

§ 371 (c)(1),
(2) Date: Mar. 22, 2024

(87) PCT Pub. No.: WO2023/078779

PCT Pub. Date: May 11, 2023

(65) Prior Publication Data

US 2024/0391445 A1 Nov. 28, 2024

(30) Foreign Application Priority Data

Nov. 2, 2021 (EP) .................................... 21205860

(51) Int. Cl.
*B60T 17/08* (2006.01)

(52) U.S. Cl.
CPC ............ *B60T 17/08* (2013.01); *B60T 17/083* (2013.01)

(58) Field of Classification Search
CPC ............................... B60T 17/08; B60T 17/083
(Continued)

(56) References Cited

U.S. PATENT DOCUMENTS 9,988,034 B2 * 6/2018 Hericher ............... B60T 17/083

FOREIGN PATENT DOCUMENTS

DE 198 30 154 A1 1/1999
DE 102016119771 A1 * 4/2018 ............ F16D 65/28
EP 2 916 028 A1 9/2015

OTHER PUBLICATIONS

International Search Report (PCT/ISA/210) issued in PCT Application No. PCT/EP2022/080100 dated Feb. 21, 2023 (3 pages).

(Continued)

*Primary Examiner* — Christopher P Schwartz
(74) *Attorney, Agent, or Firm* — Crowell & Moring LLP

(57) ABSTRACT

A pneumatic diaphragm brake cylinder for motor vehicles includes a housing part on the pressure side and a housing part facing away from the pressure side, as well as a diaphragm arranged therebetween, which divides the interior of the diaphragm brake cylinder into two chambers sealed off from one another, of which a first chamber has a pressure chamber loaded by a pneumatic pressure and a second chamber has a piston chamber for a piston actuated by the diaphragm. A peripheral fastening edge of the diaphragm is clamped between the pressure-side housing part and the housing part facing away from the pressure. The pneumatic pressure loads a surface of the diaphragm which is effective with respect to a working movement of the diaphragm. A reduction ring is provided which extends axially from the diaphragm into the housing part facing away from the pressure and which radially reduces or radially limits the effective area of the diaphragm. At least the reduction ring and the diaphragm are designed as a one-piece component.

16 Claims, 5 Drawing Sheets

(58) Field of Classification Search
USPC ............................ 188/153 D, 170; 92/63, 82
See application file for complete search history.

(56) References Cited

OTHER PUBLICATIONS

Written Opinion (PCT/ISA/237) issued in PCT Application No. PCT/EP2022/080100 dated Feb. 21, 2023 (4 pages).
Extended European Search Report issued in European Application No. 21205860.6 dated Jun. 17, 2022 (5 pages).

* cited by examiner

DIAPHRAGM BRAKE CYLINDER WITH REDUCTION RING INTEGRATED IN THE DIAPHRAGM

BACKGROUND AND SUMMARY

The invention relates to a pneumatic diaphragm brake cylinder for motor vehicles, in particular commercial vehicles, having a housing part on the pressure side and a housing part facing away from the pressure side, as well as a diaphragm arranged therebetween, which divides the interior space of the brake cylinder into two spaces sealed off from one another, of which a first space comprises or represents a pressure space loaded by a pneumatic pressure and a second space comprises or represents a piston space for a piston actuated by the membrane, wherein a peripheral fastening edge of the membrane is clamped between the pressure-side housing part and the pressure-remote housing part. Furthermore, the invention also relates to a pneumatic brake device comprising at least one such pneumatic diaphragm brake cylinder.

Such pneumatic diaphragm brake cylinders are frequently used in air brake systems for commercial vehicles, whereby they are used as service brake cylinders for a service brake by themselves or in combination with a spring brake cylinder, i.e. in a so-called combination cylinder. In this case, the housing part on the pressure side and the housing part facing away from the pressure are connected to each other, with the edge of the diaphragm being clamped at the butt joint between the housing parts. This type of construction has gained acceptance over piston brake cylinders with sliding sealing element primarily because of its robust design and cost-effective manufacture. In terms of design, the diaphragm brake cylinders mentioned have in common that an elastomeric, fabric-reinforced diaphragm is generally used to seal the service brake pressure chamber and to transmit the pneumatic pressure force to the service brake piston.

Furthermore, a combined service brake and spring brake cylinder has become known from DE 198 30 154 A1, in which an intermediate flange is used as a connecting device for a service brake cylinder and a spring brake cylinder.

It is the object of the present invention to provide a pneumatic diaphragm brake cylinder which is flexible in use and easy to manufacture. Furthermore, a pneumatic brake device with at least one such pneumatic diaphragm brake cylinder is to be provided.

This task is solved by the features of the independent claims.

The invention discloses a pneumatic diaphragm brake cylinder for motor vehicles, with a housing part on the pressure side and a housing part facing away from the pressure side, as well as a diaphragm arranged therebetween, which divides the interior space of the brake cylinder into two spaces sealed off from one another, of which a first space comprises or represents a pressure chamber loaded by a pneumatic pressure and a second space comprises or represents a piston chamber for a piston actuated by the diaphragm, wherein a peripheral fastening edge of the diaphragm is clamped between the housing part on the pressure side and the housing part facing away from the pressure side.

The pressure chamber can be vented to increase the pneumatic pressure and vented to decrease the pneumatic pressure, whereby the piston is extended from the brake cylinder by increasing the pressure and retracted into the brake cylinder by decreasing the pressure. In this case, the diaphragm performs an axial working movement, the axial direction being parallel to the piston.

Furthermore, it is envisaged that:

a) the pneumatic pressure loads an effective area of the diaphragm with respect to a working movement of the diaphragm, and
b) a reduction ring is provided which extends axially from the diaphragm into the housing part facing away from the pressure and which radially limits and in particular radially reduces the effective area of the diaphragm.

In other words, the reduction ring reduces or radially limits the inner diameter of the housing part facing away from the pressure. This variably adapts or reduces the effective area of the diaphragm for the pneumatic pressure, which can deform in particular elastically as a result of the pneumatic pressure during the working movement. This has the consequence that the force generated on the diaphragm as a result of the pneumatic pressure is adapted or reduced. The force exerted by the diaphragm cylinder via the piston can therefore be individually adjusted by means of the reduction ring.

Furthermore, it is envisaged that:

c) at least the reduction ring and the diaphragm are designed as a one-piece component.

In other words, the diaphragm and the reduction ring are integrally combined in the one-piece component. This measure simplifies the production of the diaphragm cylinder, because instead of two parts, namely a separate diaphragm and a separate reduction ring, only one single component has to be mounted to the diaphragm cylinder, in which the diaphragm and the reduction ring are integrally combined. On the other hand, this combination of the diaphragm and the reduction ring also makes the diaphragm cylinder less sensitive to leaks because the number of sealing points is reduced.

Advantageous further embodiments of the invention are disclosed by the dependent claims.

Preferably, the reduction ring is axially attached to the diaphragm on the pressure-remote side. Preferably, the reduction ring may also be radially intermediate a radially inner circumferential surface of the housing part facing away from the pressure and a piston rod which is actuated by the diaphragm. Also, a radially outer circumferential surface of the reduction ring may comprise at least one recess and/or form an annular gap with respect to the radially inner circumferential surface of the housing part facing away from the pressure, which annular gap or annular gaps form a flow connection between the second space and at least one breathing opening of the housing part facing away from the pressure.

According to a further embodiment, the diaphragm may comprise a fabric reinforced elastomer and/or the reduction ring may comprise an elastomer without fabric reinforcement.

The diaphragm can also have a bellows-shaped area extending into the housing part facing away from the pressure, which adjoins the reduction ring radially on the inside.

Preferably, the pneumatic diaphragm brake cylinder may comprise an active pneumatic service brake cylinder configured to apply a service brake when aerated and release the service brake when deaerated.

According to a further embodiment, the pressure-side housing part:

a) comprises an intermediate flange, which is designed so that a housing of a spring brake cylinder can be attached to it, or
b) comprises a housing of a spring brake cylinder.

The spring brake cylinder comprises a spring brake piston which is loaded by at least one accumulator spring and which separates a spring brake chamber, which can be ventilated and exhausted, from a spring chamber in which the at least one accumulator spring is arranged. The spring brake cylinder is preferably a passive pneumatic parking brake cylinder, which is designed to release a parking brake when the spring brake chamber is vented and to apply the parking brake when the spring brake chamber is vented.

Also, the pneumatic diaphragm brake cylinder may comprise or constitute a combination cylinder of the service brake cylinder and the spring brake cylinder.

Preferably, the fastening edge has a wedge-shaped cross-section tapering radially inwardly. Furthermore, a first edge of the pressure-side housing part and a second edge of the housing part facing away from the pressure can form axially between them a radially outwardly enlarging intermediate space which is complementary with respect to the radially inwardly tapering cross section of the fastening edge and in which the fastening edge is clamped. A compressive load on the diaphragm then pulls its fixing edge into the radially inwardly tapering intermediate space, which advantageously increases the sealing effect.

For example, the first edge and the second edge can be braced against each other by a tension band or crimped together under plastic deformation. A crimping is therefore to be understood here as a plastic deformation of the first edge and/or the second edge such that a form-fitting connection is produced between the edges.

Preferably, the reduction ring is radially intermediate a radially inner peripheral surface of the housing part facing away from the pressure and a piston rod which is actuated by the diaphragm. Centrally connected to the piston rod is a piston which is actuated by the diaphragm.

Also, a radially outer circumferential surface of the reduction ring may have at least one recess or form an annular gap with respect to the radially inner circumferential surface of the housing part facing away from the pressure, which recess or gap forms a flow connection between the second space and at least one breathing opening of the housing part facing away from the pressure. Compressed air can then escape from the piston chamber when the pressure chamber is vented and the then actuated diaphragm reduces the piston chamber.

Preferably, the diaphragm has a bellows-shaped area extending into the housing part facing away from the pressure, which adjoins the reduction ring radially on the inside.

In the pneumatic diaphragm brake cylinder, an elastomeric, fabric-reinforced diaphragm is therefore preferably used to seal the pressure chamber and to transmit the pneumatic pressure force to the piston or piston rod. However, experience from practical operation has shown that, especially with the increased operating and test pressures of modern air brake systems, sealing problems increasingly occur in the clamping zone of the diaphragm. It can happen that the diaphragm is insufficiently centred during the assembly process. This can be the case if, for example, the conical contact surfaces of the edges of the housing parts as well as the contact surfaces of the fastening edge of the diaphragm arranged between them are more or less decentered with respect to their symmetry before the clamping of the components takes place, or they are decentered if a radial displacement of the components with respect to each other occurs during the clamping operation. This occurs frequently, especially in manual manufacturing operations. This leads to a non-constant compression of the fastening edge over the circumference and promotes leakage at points with reduced compression.

To overcome this problem, a centering ring is preferably integrally formed on the diaphragm, which is arranged radially inwardly offset with respect to the peripheral fastening edge, projects axially into the pressure-side housing part and centers the diaphragm with respect to a radially inner circumferential surface of the pressure-side housing part. For example, the centering ring may be arranged substantially perpendicular to a center plane of the peripheral fastening edge and/or parallel to a radially inner peripheral surface of the pressure side housing portion. Preferably, the centering ring contacts the radially inner circumferential surface of the pressure side housing portion, thereby creating the centering. Thus, in this case, the diaphragm, the reduction ring and the centering ring may form the integrated one-piece component.

The invention also relates to a pneumatic braking device comprising at least one pneumatic diaphragm brake cylinder described above, and also to a vehicle comprising such a pneumatic braking device.

An example of an embodiment of the invention is described in more detail in the following description with reference to the figures.

DETAILED DESCRIPTION OF THE DRAWINGS

Figure 1:
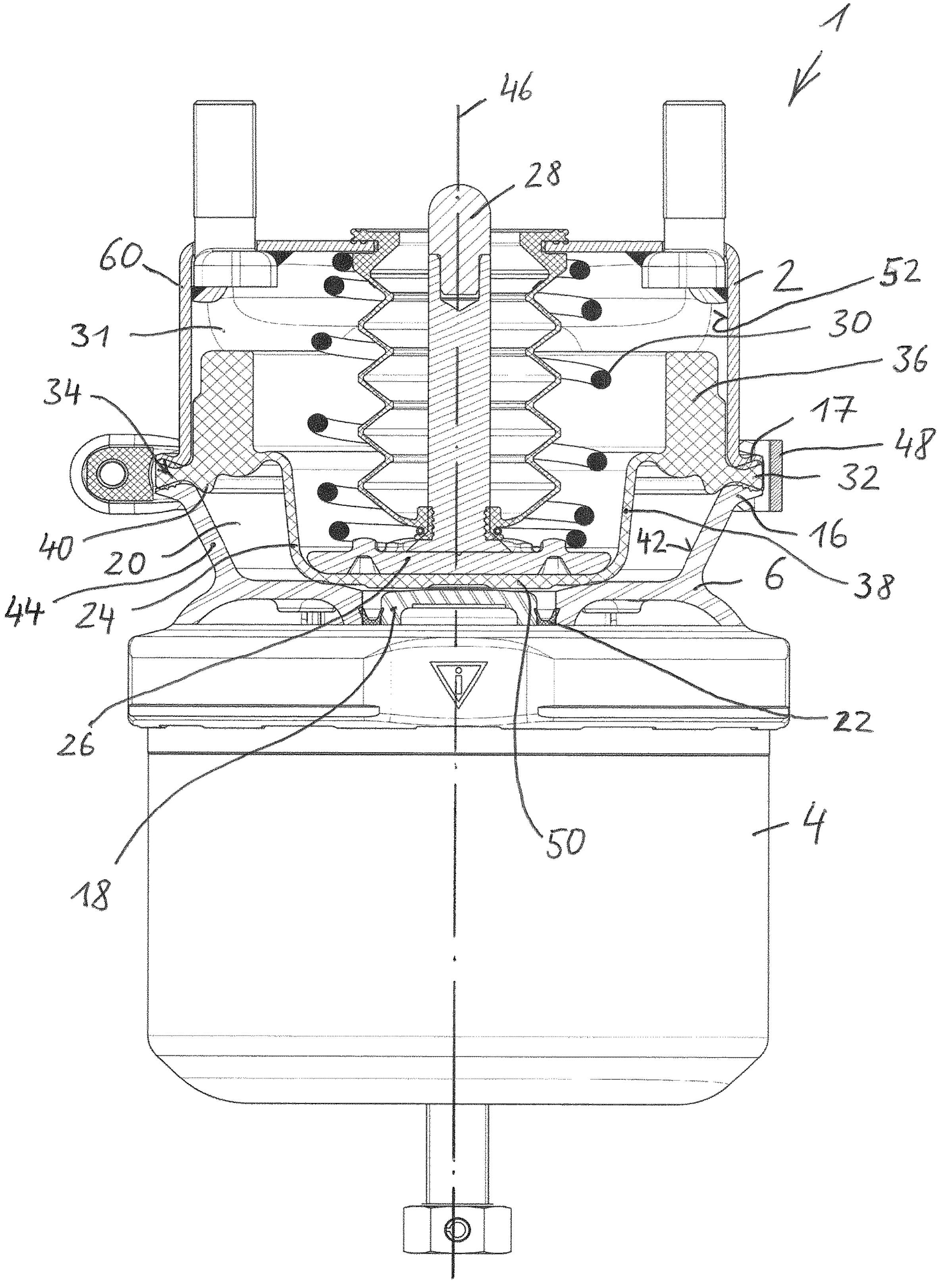
FIG. 1 is a partial longitudinal section view of a pneumatic diaphragm brake cylinder according to a preferred embodiment of the invention.

In FIG. 1 to FIG. 5, a combined service brake and spring brake cylinder 1, hereinafter referred to as a combination cylinder, is shown as a preferred embodiment of a pneumatic diaphragm brake cylinder. The combined service brake and spring brake cylinder 1 comprises a service brake cylinder 2, an intermediate flange 6 and a spring brake cylinder 4, wherein the service brake cylinder 2 is structurally and functionally connected to the spring brake cylinder 4 by the intermediate flange 6. A spring brake piston 8 is displaceably arranged within the spring brake cylinder 4, wherein an accumulator spring 10 rests against one side of the spring brake piston 8. The accumulator spring 10 is supported on its opposite side on the base of the spring brake cylinder 4. A spring brake chamber 12 is formed between the spring brake piston 8 and the intermediate flange 6, which chamber communicates, for example, with an electro-pneumatic valve device, not shown for reasons of scale, for venting and exhausting the same. When ventilated, the spring brake piston 8 is displaced axially into the parking brake release position under tension of the accumulator spring 10. During this displacement of the spring brake piston 8, the air which is present inside the spring chamber 14 accommodating the accumulator spring 10 is forced out via a vent not shown here. If, on the other hand, the spring brake chamber 12 is vented for the purpose of braking, then the accumulator spring 10 is able to displace the spring brake piston 8 into the applied position.

The spring brake piston 8 is connected to a hollow piston rod 18, which extends through the intermediate flange 6 into a pressure chamber 20 of the service brake cylinder 2 and is supported there on a diaphragm plate 26. A seal 22 inserted in the intermediate flange 6 seals against the outer wall of the piston rod 18 during its longitudinal movement. An inlet, which is not shown, opens into the pressure chamber 20, via which compressed air is admitted and discharged for actuating the service brake cylinder 2. The compressed air acts on a diaphragm 24 inserted within the service brake cylinder 2, on the opposite side of which a piston in the form of the rigid diaphragm plate 26 is provided. More precisely, the diaphragm 24 separates the pressure chamber 20 of the service brake cylinder 2, which can be charged and discharged with pressure medium, from a piston chamber 31 accommodating a return spring 30 supported on the diaphragm plate 26. In relation to the service brake function and the pneumatic pressure prevailing in the pressure chamber 20, the intermediate flange 6 therefore forms here a housing part on the pressure side and the service brake cylinder 2 or its piston chamber 31 forms a housing part of the combined service brake and spring brake cylinder 1 facing away from the pressure.

The diaphragm plate 26 is connected to a push rod 28, which interacts with a brake actuating mechanism external to the combined service brake and spring brake cylinder 1. This may be, for example, actuating elements of a disc brake of a motor vehicle. The service brake cylinder 2 is an active brake cylinder, that is to say that the service brake is applied by venting the service brake chamber 20 and released by venting. The return spring 30, which is supported on the one hand on the diaphragm plate 26 and on the other hand on the base of the service brake cylinder 2, ensures that the pressure rod 28 is returned to the release position when the service brake chamber 20 is vented.

A radially outer attachment edge 32 of diaphragm 24 has a wedge-shaped cross-section tapering radially inwardly. This radially outer mounting edge 32 of the diaphragm 24, having a wedge-shaped cross-section tapering radially inwardly, is clamped between a first edge 16 of the intermediate flange 6 and a second edge 17 of the service brake cylinder 2 in a complementary shaped intermediate space or gap 34 having a wedge-shaped cross-section flaring radially outwardly. The intermediate flange 6 and the service brake cylinder 2 therefore form their edges 16, 17 as radially outwardly bent flanges, the oppositely facing inner surfaces of which form the intermediate space 34 of wedge-shaped cross-section between them.

Furthermore, at least one centering ring 40 extending in the axial direction and arranged offset radially inwardly with respect to the fastening edge 32 is formed or integrally formed on the diaphragm 24, which centering ring 40 points axially towards the intermediate flange 6 and by means of which the diaphragm 24 is centered against a radially inner circumferential surface 42 of the wall 44 of the intermediate flange 6. Particularly preferably, the centering ring 40 is arranged substantially perpendicular to a central plane of the peripheral fastening edge 32 and projects away from the diaphragm 24 on one side, for example. However, it is also conceivable that instead of this one centering ring 40, or additionally, a further centering ring is provided which projects in the direction of the spring brake cylinder 4 and centers against the radially inner circumferential surface of the wall thereof.

Last but not least, the radially inner circumferential surface 42 of the intermediate flange 6, against which the centering ring 40 centers, preferably lies on an imaginary cone, whose center axis is coaxial with the cylinder axis 46.

As shown, the centering ring 40 may be formed to be completely circumferential, as viewed in the circumferential direction, or to comprise ring sections. The diaphragm 24 and the centering ring 40 integrally formed therewith preferably comprise a fabric-reinforced elastomer.

Then, an axial component of the clamping force between the intermediate flange 6 and the service brake cylinder 2 causes the centering ring 40 of the diaphragm 24 to be pressed against the radially inner peripheral surface 42 of the wall 44 of the intermediate flange 6. In other words, the axial component of the clamping force ensures that the fastening edge 32 is pulled radially outwards due to the wedge effect and thereby the centering ring 40 is pressed with higher radial force against the radially inner circumferential surface 42 of the wall 44 of the intermediate flange 6 in the sense of a self-reinforcement of the centering.

Such an axial clamping force component can be realized, for example, by the second edge 17 of the service brake cylinder 2 and the first edge 16 of the intermediate wall 6 being overlapped by a clamping band 48, which then provides the axial component of the clamping force.

The diaphragm 24, the centering ring 40 and a reduction ring 36 form an integrated, one-piece component 38. While, as explained above, the diaphragm 24 and the centering ring 40 integrally formed therewith preferably comprise a fabric-reinforced elastomer, the reduction ring 36 comprises, for example, the same elastomer but without fabric reinforcement. The centering ring 40 is optional, however, because according to an embodiment not shown here, the one-piece component can also comprise only the diaphragm 24 and the reduction ring 36.

The reduction ring 36 extends axially from the diaphragm 24 into the service brake cylinder 2. Further, the reduction ring 36 is substantially cylindrical and has a wall thickness which is a difference between the outer diameter and the inner diameter of the reduction ring 36.

Preferably, the reduction ring 36 is axially attached to the diaphragm 24 on the pressure-relief side, i.e. in the direction of the piston chamber 31 of the service brake cylinder 2. Also, the reduction ring 36 is radially intermediate a radially inner circumferential surface 52 of the service brake cylinder 2 and the push rod 28 which is actuated by the diaphragm 24.

Figure 3:
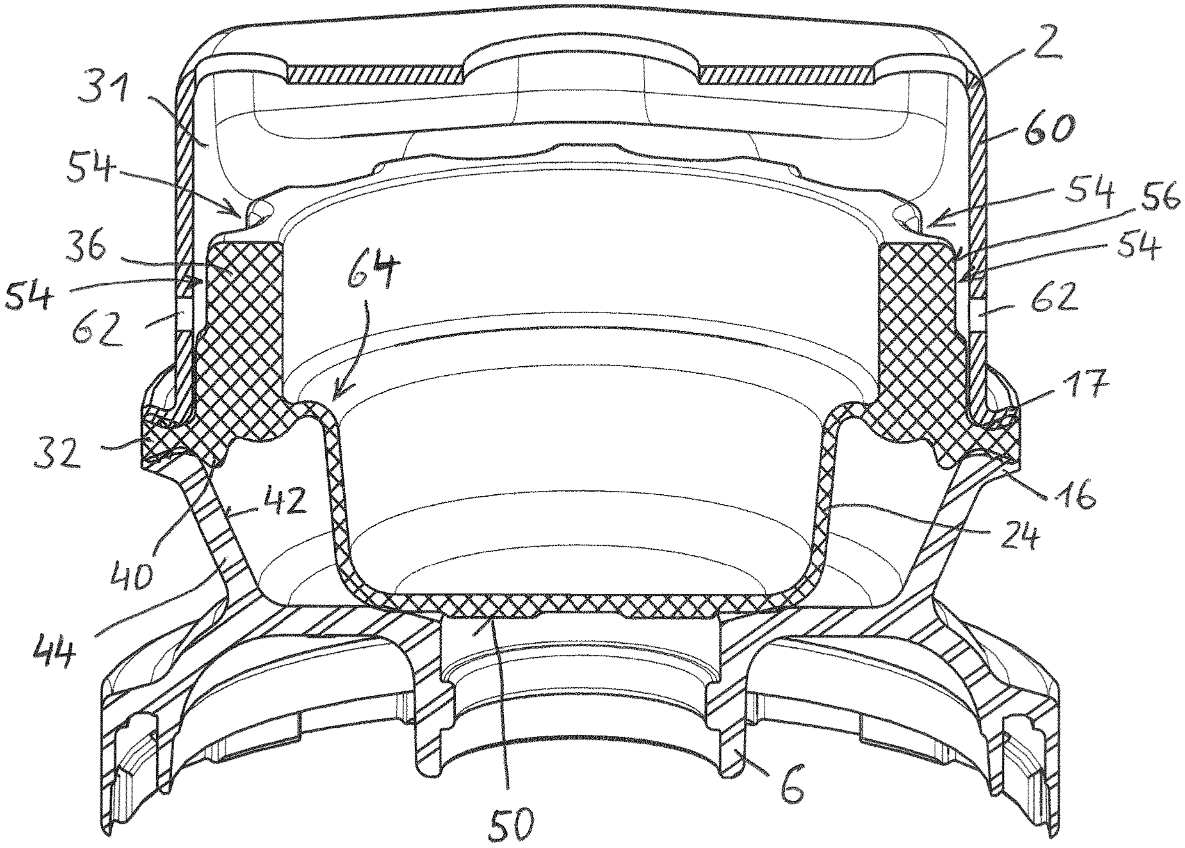
FIG. 3 is a longitudinal section view of two housing parts and an assembly consisting of a diaphragm and a reduction ring of the pneumatic diaphragm brake cylinder of FIG. 1.
Figure 4:
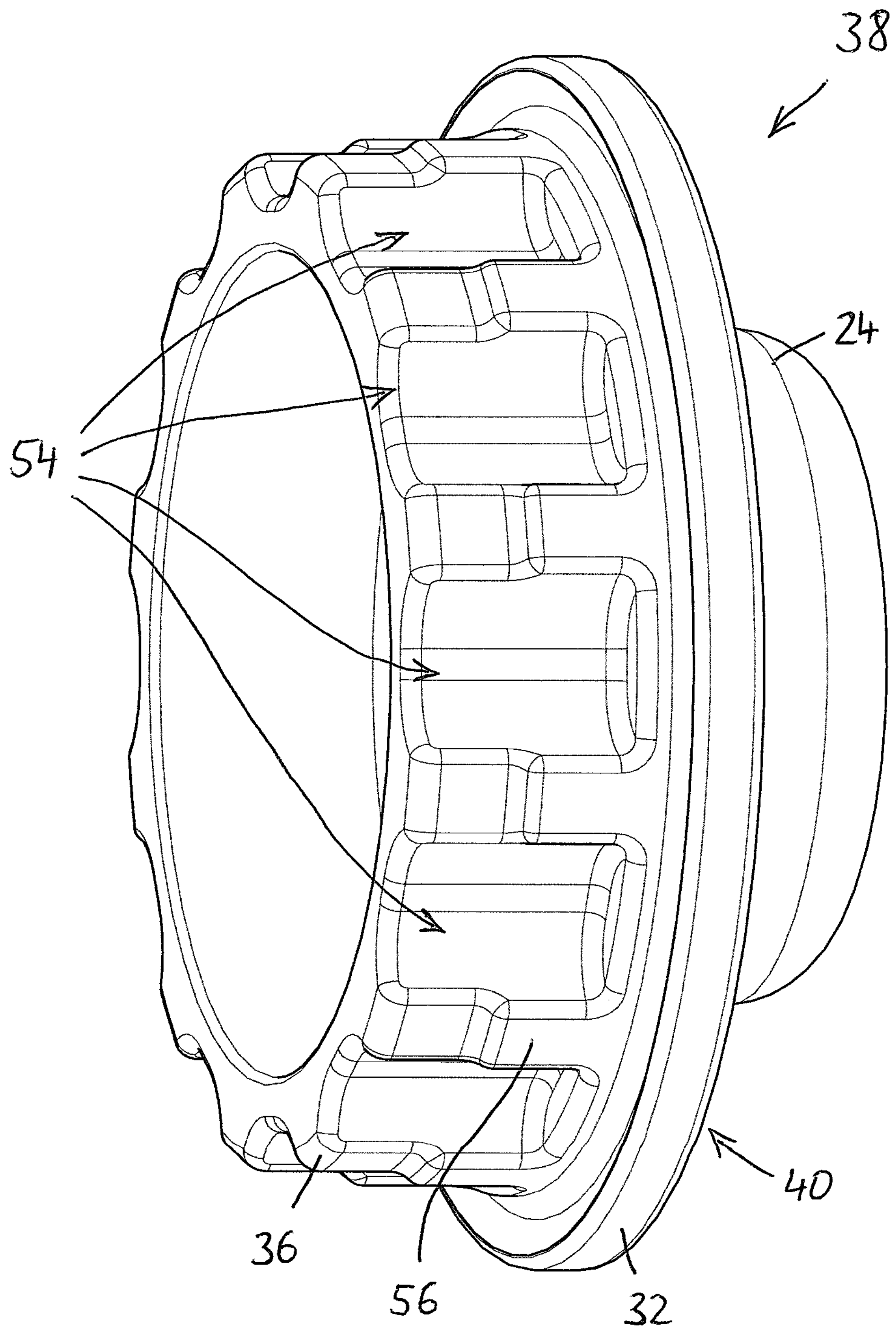
FIG. 4 is a perspective view of the assembly unit consisting of the diaphragm and the reduction ring of FIG. 3.

As FIG. 4 shows, a radially outer circumferential surface 56 of the reduction ring 36 may here, for example, have axial recesses 54 distributed in the circumferential direction and contact with its remaining surface a radially inner circumferential surface 52 of the service brake cylinder 2, as is best illustrated with reference to FIG. 3. Furthermore, breathing openings 62 may be formed in a wall 60 of the service brake cylinder 2 in the region of the piston chamber 31 and here in particular also in the region of the reduction ring 36, which are arranged in such a way that they are permanently connected to the piston chamber 31 of the service brake cylinder 2 by means of the recesses 54. The recesses 54 therefore form a flow connection between the piston chamber 31 and the breathing openings 62 of the service brake cylinder 2. This flow connection comes into effect when, as a result of the axial working movement of the diaphragm 24, the piston chamber is reduced or enlarged so that air is forced out of the piston chamber 31 or drawn into the piston chamber.

Instead of radially outer recesses 54 or in addition thereto, an annular gap may also be provided between the radially outer peripheral surface 56 of the reduction ring 36 and the radially inner peripheral surface 52 of the service brake cylinder 2, which then also creates such a flow connection.

Figure 2:
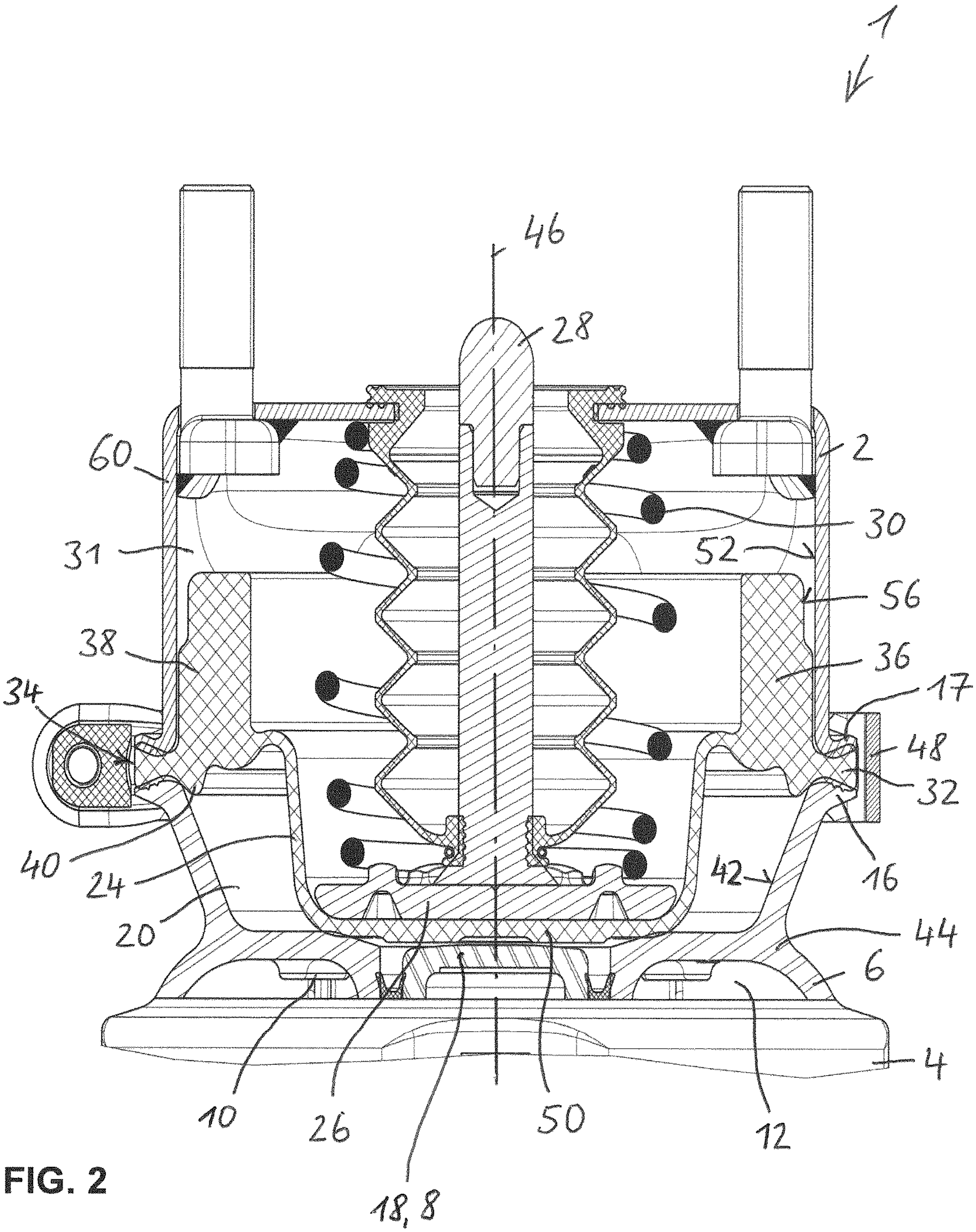
FIG. 2 is a section view of FIG. 1.

As can be readily imagined with reference to FIG. 2, the pneumatic pressure present in the pressure chamber 20 with respect to a working movement of the diaphragm 24 loads an effective area 50 of the diaphragm 24. The effective area 50 of the diaphragm 24 therefore represents an area which can perform the working movement occurring here parallel to the cylinder axis 46 when the pressure chamber 20 is vented.

The purpose of the reduction ring 36 is then to radially reduce the effective area 50 of the diaphragm 24, whereby the reduction ring 36 then also reduces the internal diameter of the service brake cylinder 2. This reduces the effective area 50 of the diaphragm 24 for the pneumatic pressure, which can deform elastically as a result of the pneumatic pressure in the pressure chamber 20. As a result, the force generated at the diaphragm 24 as a result of the pneumatic pressure in the pressure chamber 20 decreases, for example. The wall thickness of the reduction ring 36 can therefore be used to individually adjust the force exerted by the service brake cylinder 2 via the piston rod 28.

As can best be seen from FIG. 3, the diaphragm 24 has a bellows-shaped portion 64 extending into the service brake cylinder 2, which is radially inwardly adjacent to the reduction ring 36.

Figure 5:
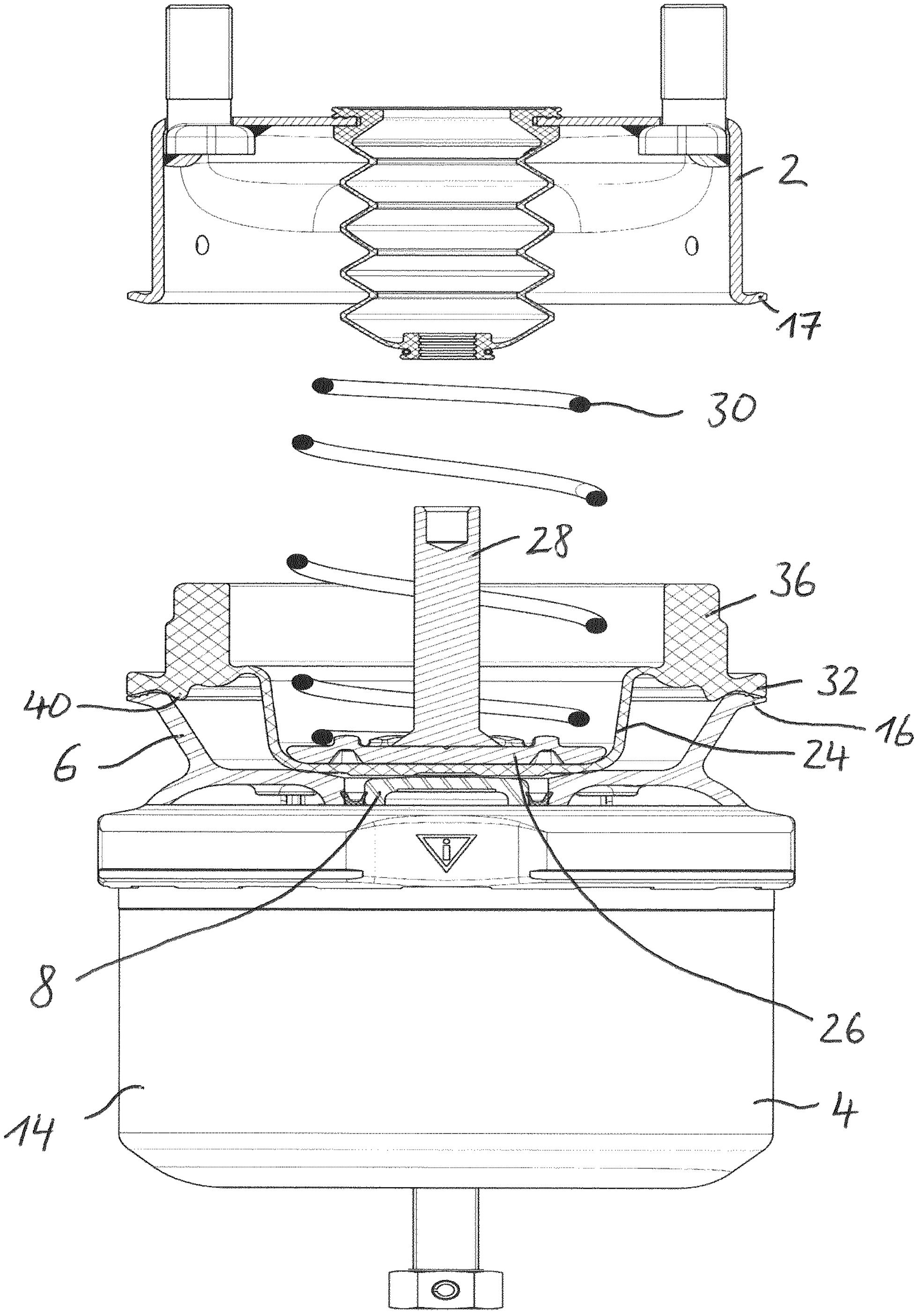
FIG. 5 illustrates an assembly step of the pneumatic diaphragm brake cylinder of FIG. 1.

If the reduction ring 36, the diaphragm 24 and optionally also the centering ring 40 are designed as a one-piece component 38, then the manufacturing of the combined service brake and spring brake cylinder 1 is simplified because instead of two parts, namely a separate diaphragm and a separate reduction ring, only the one one-piece component 38 has to be assembled to the combined service brake and spring brake cylinder 1, as shown with reference to FIG. 5. There, an assembly step of an assembly of the combined service brake and spring brake cylinder 1 is illustrated in which on the other hand, this combination of the diaphragm 24, the reduction ring 36 and optionally also the centering ring 40 also ensures a higher insensitivity of the combined service brake and spring brake cylinder 1 to leaks, because the number of sealing points is reduced.

The use of the one-piece component 38 according to the invention comprising diaphragm 24, reduction ring 36 and optionally centering ring 40 is not limited to a combined service brake and spring brake cylinder 1, but such a one-piece component can of course be used with any type of pneumatic diaphragm brake cylinder.

LIST OF REFERENCE SIGNS

1 combined service brake and spring brake cylinder
2 service brake cylinder
4 spring brake cylinder
6 intermediate flange
8 spring brake piston
10 storage spring
12 spring brake chamber
14 spring chamber
16 first edge
17 second edge
18 piston rod
20 pressure chamber
22 seal
24 membrane
26 diaphragm plate (piston)
28 push rod
30 return spring
31 piston chamber
32 peripheral fastening edge
34 intermediate space
36 reduction ring
38 one-piece component
40 centering ring
42 radial inner circumferential surface
44 wall
46 cylinder axis
48 tension band
50 effective area
52 radial inner circumferential surface
54 recesses
56 radial outer circumferential surface
60 wall
62 breathing openings
64 bellows-shaped portion

The invention claimed is:

1. A pneumatic diaphragm brake cylinder for a motor vehicle, comprising:
- a pressure-side housing part on a pressure side;
- a pressure-remote housing part facing away from the pressure side;
- a diaphragm which is arranged between the housing parts and divides an interior of the diaphragm brake cylinder into two spaces which are sealed off from one another, of which a first chamber comprises a pressure chamber loaded by a pneumatic pressure and a second chamber comprises a piston chamber for a piston actuated by the diaphragm, wherein
- a peripheral fastening edge of the diaphragm is clamped between the pressure-side housing part and the pressure-remote housing part, wherein the diaphragm is arranged between the pressure-side housing part and the pressure-remote housing part, wherein:
- a) pneumatic pressure loads an effective surface of the diaphragm with respect to a working movement of the diaphragm,
- b) a reduction ring extends axially from the diaphragm into the pressure-remote housing part facing away from the pressure, which reduction ring limits an effective area of the diaphragm radially on the outside, and
- c) at least the reduction ring and the diaphragm are formed as a one-piece component.

2. The pneumatic diaphragm brake cylinder according to claim 1, wherein the peripheral fastening edge has a wedge-shaped cross-section tapering radially inwardly.

3. The pneumatic diaphragm brake cylinder according to claim 2, wherein
- a first edge of the pressure-side housing part and a second edge of the pressure-remote housing part form axially between them an intermediate space which is complementary with respect to the cross section of the fastening edge tapering radially inwards and increases radially outwards and in which the fastening edge is clamped.

4. The pneumatic diaphragm brake cylinder according to claim 3, wherein the first edge and the second edge are braced against each other by a tension band or are flanged together under plastic deformation.

5. The pneumatic diaphragm brake cylinder according to claim 1, wherein the reduction ring is axially attached to the diaphragm on the pressure-remote side.

6. The pneumatic diaphragm brake cylinder according to claim 5, wherein the diaphragm has a bellows-shaped portion extending into the pressure-remote housing part facing away from the pressure, which region adjoins the reduction ring radially on the inside.

7. The pneumatic diaphragm brake cylinder according to claim 1, wherein a centering ring is arranged on the diaphragm and is integrally formed thereon, the centering ring is arranged offset radially inwards with respect to the circumferential fastening edge, projects axially into the pressure-side housing part, and centers the diaphragm with respect to a radially inner circumferential surface of the pressure-side housing part.

8. The pneumatic diaphragm brake cylinder according to claim 7, wherein the centering ring is disposed substantially perpendicular to a center plane of the peripheral fastening edge.

9. The pneumatic diaphragm brake cylinder according to claim 1, wherein the reduction ring is radially interposed between a radially inner circumferential surface of the pressure-remote housing part facing away from the pressure and a piston rod which is actuated by the diaphragm.

10. The pneumatic diaphragm brake cylinder according to claim 9, wherein a radially outer circumferential surface of the reduction ring has at least one recess and/or forms an annular gap with respect to the radially inner circumferential surface of the pressure-remote housing part facing away from the pressure, which annular gap or annular gaps form a flow connection between the second chamber and at least one breathing opening of the pressure-remote housing part.

11. The pneumatic diaphragm brake cylinder according to claim 1, wherein the brake cylinder comprises a pneumatic service brake cylinder.

12. The pneumatic diaphragm brake cylinder according to claim 11, wherein the brake cylinder comprises a combination cylinder of the service brake cylinder and a spring brake cylinder.

13. The pneumatic diaphragm brake cylinder according to claim 1, wherein the diaphragm consists essentially of a fabric-reinforced elastomer.

14. The pneumatic diaphragm brake cylinder according to claim 1, wherein the reduction ring is made of an elastomer without fabric reinforcement.

15. The pneumatic diaphragm brake cylinder according to claim 1, wherein the pressure-side housing part comprises:

a) an intermediate flange, which is designed so that a spring brake cylinder is attachable, or b) a spring brake cylinder.

16. A pneumatic brake device comprising at least one pneumatic diaphragm brake cylinder according to claim 1.

* * * * *